UNITED STATES PATENT OFFICE.

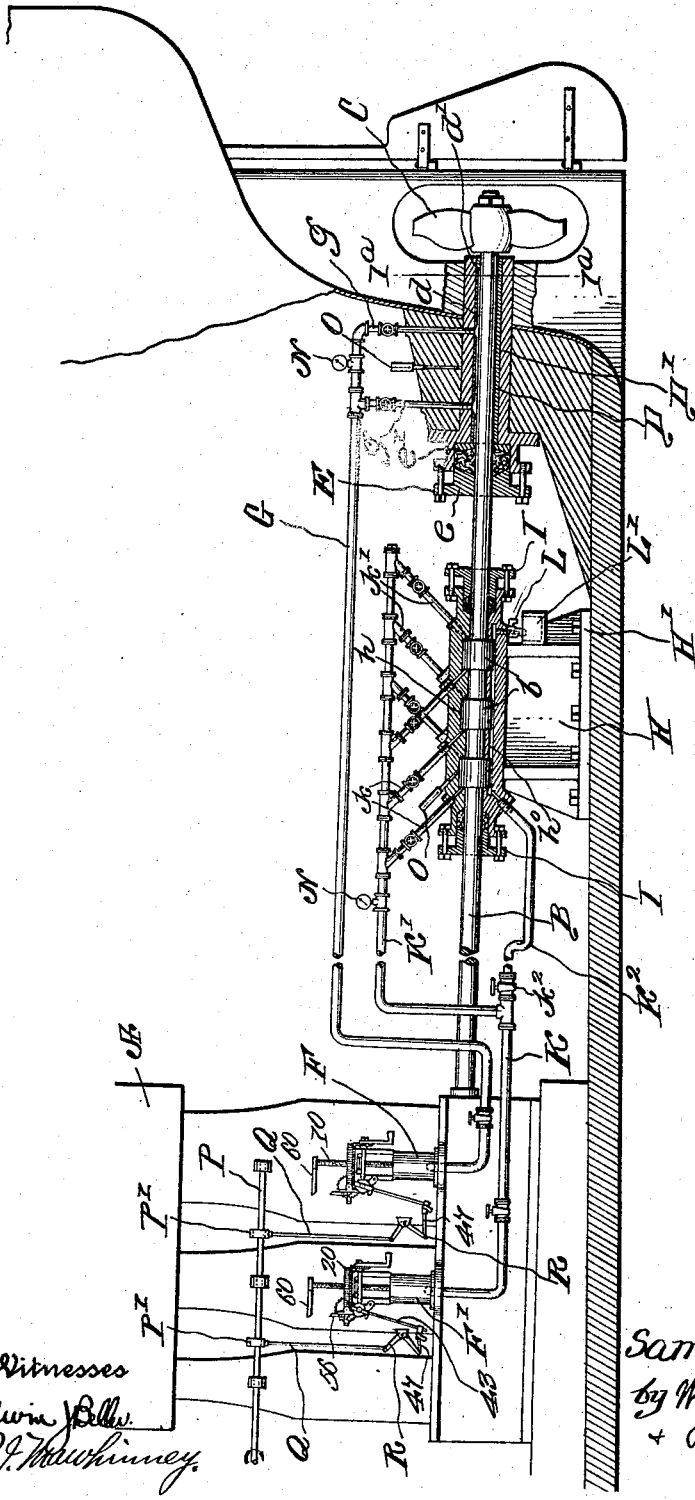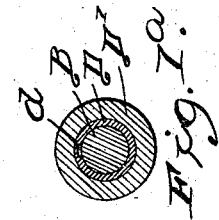

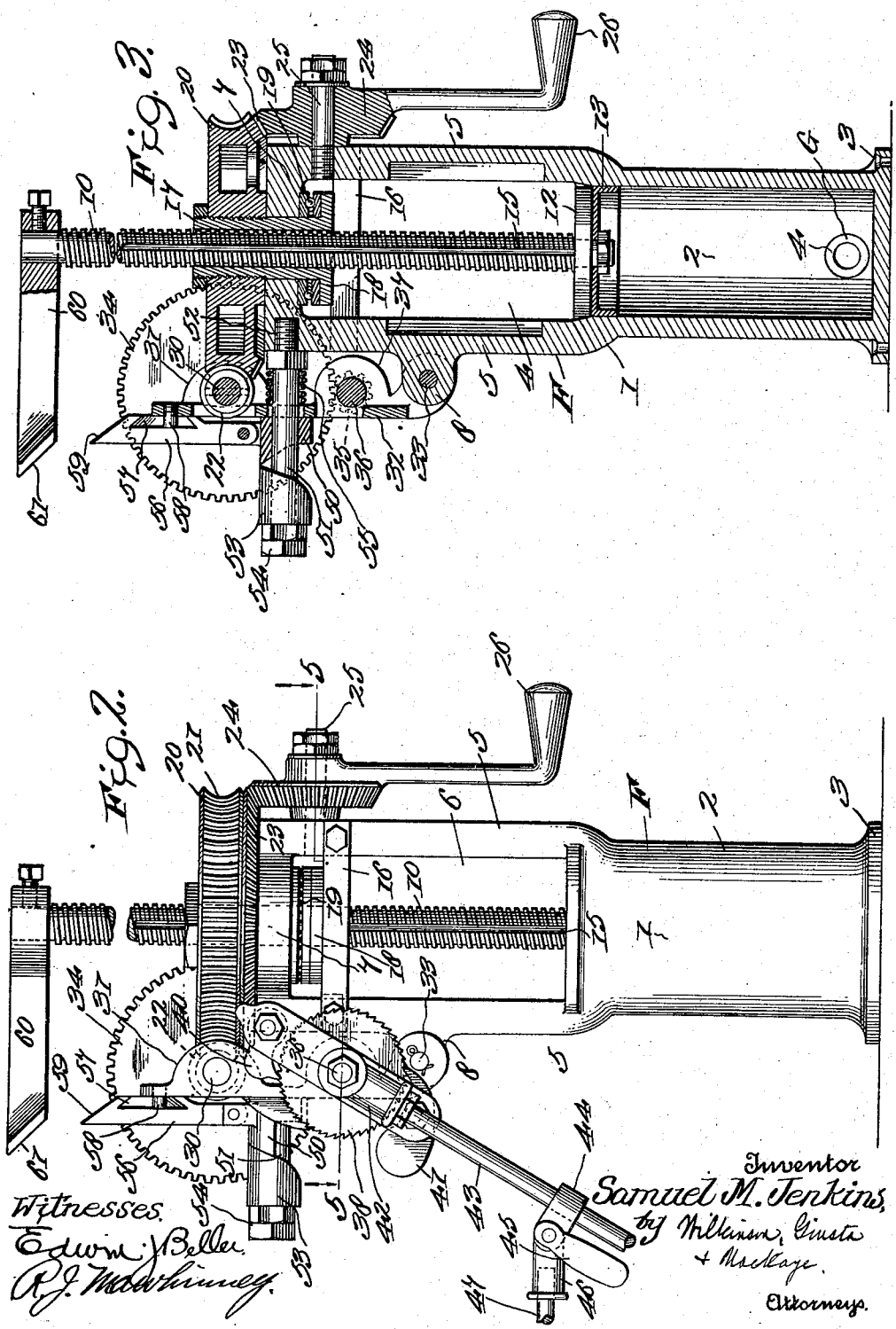

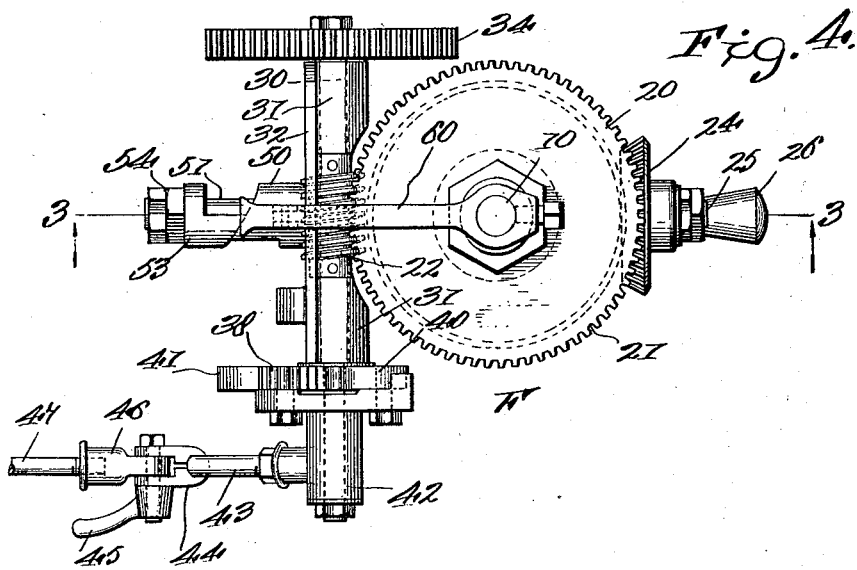
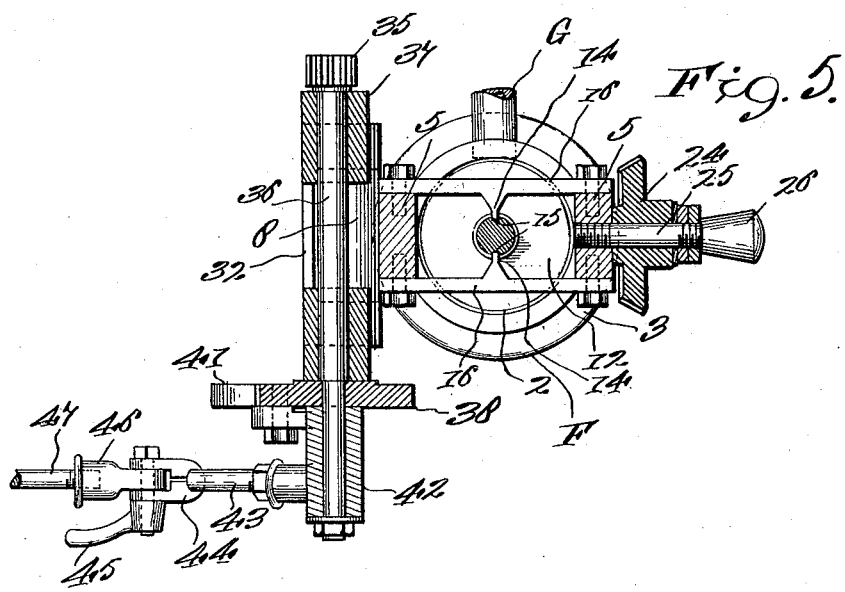

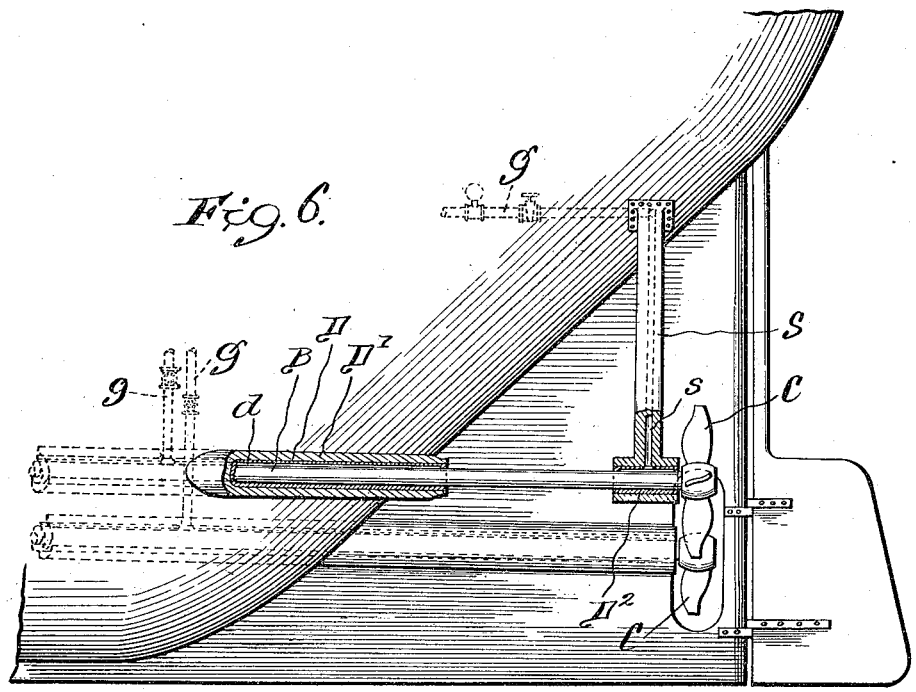
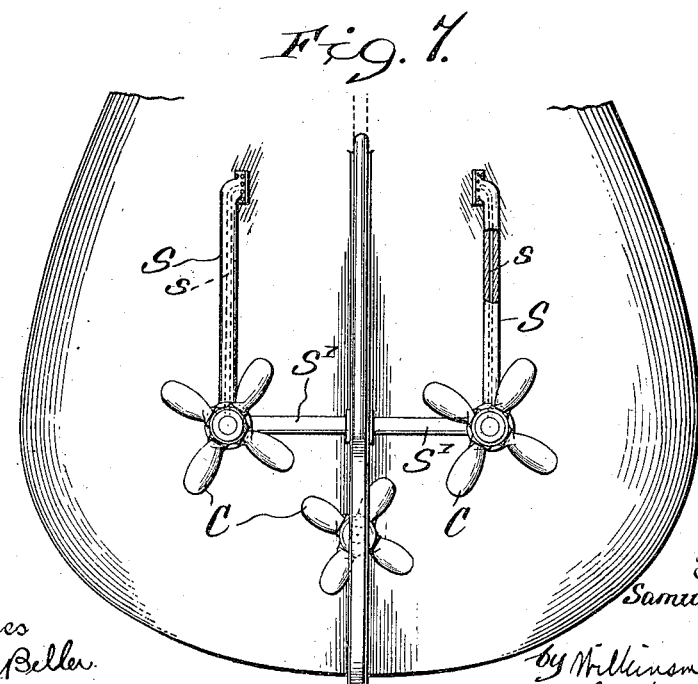

SAMUEL M. JENKINS, OF LOUISVILLE, KENTUCKY, ASSIGNOR TO THE JENKINS GRAPHITE LUBRICATING COMPANY, OF LOUISVILLE, KENTUCKY, A CORPORATION OF KENTUCKY.

SYSTEM OF FORCE-FEED LUBRICATION.

1,223,175.  Specification of Letters Patent.  Patented Apr. 17, 1917.

Application filed April 18, 1916. Serial No. 91,954.

*To all whom it may concern:*

Be it known that I, SAMUEL M. JENKINS, a citizen of the United States, residing at Louisville, in the county of Jefferson and State of Kentucky, have invented certain new and useful Improvements in Systems of Force-Feed Lubrication; and I do hereby declare the following to be a full, clear, and exact description of the invention, such as will enable others skilled in the art to which it appertains to make and use the same.

My present invention relates to systems of force feed lubrication, and it is intended especially to provide for the lubrication of tail and thrust bearings for propeller shafts, including both the method of effecting such lubrication and the apparatus for carrying out the method.

According to my invention I mount the tail and thrust bearings of the propeller shaft, respectively, in closed jackets and I force lubricant under pressure into contact with the surfaces in frictional engagement, as will be hereinafter more fully described and claimed.

My invention also relates to improved force feed lubricators especially adapted to be used in the system, and which are driven from the main engine and at a speed proportional to the speed of the engine, and, therefore, also driven at a speed proportional to that of the angular velocity of the propeller shaft.

My invention will be understood by reference to the accompanying drawings, in which:—

Figure 1 shows a sectional elevation through the stern of a ship showing diagrammatically a triple expansion engine and the propeller in elevation, with the thrust and tail bearings of said shaft in vertical longitudinal section;

Fig. 1ª shows a section along the line 1ª—1ª of the tail bearing and propeller shaft shown in Fig. 1;

Fig. 2 is a front view of one of the force feed lubricators intended for use in the system;

Fig. 3 shows a central vertical section through the force feed lubricator of Fig. 2, the section being shown along the line 3—3 of Fig. 4, and looking in the direction of the arrows, and parts being shown in elevation;

Fig. 4 is a plan view of the device shown in Figs. 2 and 3;

Fig. 5 shows a section along the line 5—5 of Fig. 2, and looking down; and

Figs. 6 and 7 show means for lubricating shaft bearings in struts.

Referring first to Figs. 1 and 1ª, A represents a main engine of a suitable type, such as a triple expansion engine which drives in the usual way the line shafting and the propeller shaft B connected thereto, carrying the propeller C.

While I have shown a single propeller shaft and propeller, and a special type of triple expansion engine, the style of engine, and the number of propeller shafts and propellers, may be varied as required.

The tail bearing of the propeller shaft comprises an inner sleeve D of phosphor bronze, or other suitable metal, fitting snugly over the propeller shaft and inclosed in an outer sleeve D', which is provided with a suitable stuffing box E, having the follower e and the packing e' to form a tight joint to prevent escape of grease inboard.

The metal sleeve D is provided with an elongated axial slot d terminating, as at d', near the outer end of said sleeve, and this slot d is intended to provide a free passage for the grease which is forced in from the lubricator F through the pipe G and branch pipes g. These branch pipes g open into the longitudinal slot d, and deliver lubricant to the surfaces of the tail shaft, under pressure, and this lubricant gradually leaks out through the small clearance space which inevitably exists between the rear end of the sleeve D and the propeller shaft; so that sufficient grease must be supplied to make up for this leakage, and at the same time to maintain the requisite pressure on the interior of the sleeve D.

The special construction of the lubricator itself will be hereinafter described with reference to Figs. 2–5.

The thrust bearing H for the propeller shaft is rigidly mounted on the bed plate or frame H', and is provided with a series of annular grooves h adapted to receive the annular collars $b$ on the propeller shaft, and to provide a vertical bearing surface for the edges of said collars when the propeller shaft is being driven either for going ahead or backing.

The ends of the housing containing the thrust bearings are closed by suitable stuffing boxes I to prevent the leakage of grease from said housing.

The lubricant is forced from the lubricator F′ through the pipes K and K′ and the branch pipes $k$ to the rear side of the collars $b$, thus lubricating the thrust bearings while the propeller is being driven for going ahead. Similar branch pipes $k'$ are provided for lubricating the rear faces of the collars $b$, thus lubricating the thrust bearing when the propeller is being driven for going astern.

These pipes K and K′ are provided with suitable valves which should be closed, respectively, to cut off the branch pipes for the time being not used in lubricating the thrust bearings.

Beneath the collars $b$ in the housing of the thrust bearing I provide an elongated chamber $h°$ into which the various collars $b$ dip, and into which the lubricant supplied from above the propeller shaft falls and settles. Thus, this chamber $h°$ forms a grease chamber into which the rotating collars $b$ dip. This chamber $h°$ is preferably provided at one end with a pop valve L, so that when the pressure of the lubricant in the housing becomes excessive the same may be relieved.

Beneath this pop valve a suitable receptacle L′ for the escaping grease may be provided, if desired.

I may also provide a pipe $K^2$, controlled by the valve $k^2$, connected at one end to the pipe K, for carrying the lubricant from the lubricator F′, and connected at the other end to the chamber $h°$ in the housing H. By opening this valve $k^2$ lubricant may be supplied directly to this chamber $h°$ when desired.

In Figs. 6 and 7 I have shown the system applied to shaft bearings in struts, in which S and S′ represent the struts in one or both of which passages $s$ for the lubricant are provided. The lubricant is fed through the pipe $g$ to the interior of the sleeve $D^2$ forming an auxiliary bearing for the shaft B; the main tail bearing being shown at D, see Fig. 6, and being generally similar to that already described with reference to Figs. 1 and 1ᵃ.

Suitable pressure gages N may be provided wherever needed in the system, and also suitable thermometers O for determining the temperatures of the bearings, or any parts thereof.

The lubricant to be supplied to the system is preferably in the form of a semi-viscous fluid, which is forced to the thrust and tail bearings by suitable force feed lubricators, such, for instance, as the lubricators F and F′, which are driven from the main engine in any convenient way, as by means of the drive shaft P, carrying the eccentrics P′, which eccentrics drive the rods Q and the bell crank levers R, which operate the lubricators F and F′, which will now be described with reference to Figs. 2–5 of the drawings.

The lubricator F, or F′, (see Fig. 1) comprises a metal casting 1 provided with a grease cylinder 2 in the lower portion thereof, which is flanged as at 3, and is secured to any suitable bed-plate or any other foundation. This grease cylinder is provided with one or more outlets 4. Above the grease cylinder the casting 1 is provided with the vertical stanchions 5, cut away as at 6 to permit access to the parts and permit the filling of the grease cylinder when the piston therein is lifted.

These vertical stanchions 5 are connected by the cross head 7, and the boss 8 is provided for the hinged frame carrying the worm, as will be hereinafter more fully described.

10 represents a screw-threaded piston rod attached at its lower end to the piston 12, which is provided with a cup leather 13, as shown in Fig. 3. This piston rod is held against turning by means of the keys 14 which project into the spline grooves 15 in the piston rod 10. These keys are secured to or integral with the cross bars 16, bolted to the stanchions 5, and thus the piston rod is held rigidly against turning, but is permitted to slide vertically.

This piston rod is mounted in the internally screw-threaded sleeve 17, which is flanged as at 18, and between which flange and the cross head 7 I provide antifriction bearings 19. To the exterior of this screw-threaded sleeve 17 the worm gear 20 is attached, and this worm gear is provided with worm teeth 21 to engage in the worm 22, and with bevel teeth 23 to engage in the bevel pinion 24, journaled on the pin 25, and provided with a handle 26, so that the worm gear 21 may be turned by hand when desired.

The worm 22 is carried on the shaft 30, pivoted in bearings 31 on the frame 32, which is hinged at 33 to the boss 8. One end of this shaft 30 carries the gear wheel 34, which meshes in the pinion 35 mounted on the shaft 36, journaled in the bearings 37 in the hinged frame 32, and provided with a ratchet wheel 38 driven by the pawls 40 and 41, pivoted to the cross head 42, which is journaled on the shaft 36. These pawls are preferably gravity-controlled, as shown in Fig. 2, so as to avoid the necessity of using springs, but spring-controlled pawls may be used if desired.

Projecting from this cross head 42 is the arm 43, which is connected to any reciprocating part of the machinery and driven thereby.

In Figs. 1, 2, 4 and 5 I have shown a connection comprising a clamp 44, adjustably connected to the arm 43 by means of the clamp lever 45 and the clamp bolt 46. Attached to this bolt is a rod 47, connected to the bell crank lever R (see Fig. 1), which bell crank lever is driven by the eccentric P', as shown in Fig. 1; but this arm 43 may be connected to any reciprocating part of the mechanism driven by the main engine, and may be driven in any convenient way, so long as the reciprocations of said rod are proportional to the speed of the engine driving the shaft to be lubricated.

By moving the clamp 44 up or down on the arm 43, the stroke of the cross head 42 may be varied at will, and thus the angular distance through which the ratchet wheel 38 may be turned at each stroke is regulated. It will be obvious that the amount of lubricant fed each stroke will depend upon the angular throw of the ratchet wheel and the train of gearing actuated thereby.

In Figs. 2, 3 and 4 I have shown the various parts in the position assumed when the worm is being driven by the engine and is in engagement with the worm gear and operating the lubricator.

The swinging frame is pressed forward to the position shown in Fig. 3 by the movable helix 50, mounted on the fixed pin 51, which is screwed into the cross head 7, as at 52. This movable helix 50 engages the fixed helix 53, which is secured on the pin 51 by means of the lock nuts 54.

This pin 51 carries a stout coil spring 55 which normally tends to throw the hinged frame 32 outward about its pivot 33, but this effect of the spring is counteracted by the engagement of the movable helix 50 with the fixed helix 53 when the parts are in the engaging position shown in Fig. 3. This movable helix 50 has hinged thereto a hinged hand lever 56 which is provided with an undercut 57 adapted to engage the locking pin 58 carried by the hinged frame 32.

The movable helix 50 may be turned by this hinged hand lever 56 into the engaging position shown in Fig. 3, and then swung into the locking position as shown in said figure, and will be held firmly locked through the normal operation of the lubricator when driven by the engine. But, in order to throw the lubricator out of engagement when the grease cylinder is quite or nearly empty, I provide a tripping arrangement comprising an arm 60, carried by the piston rod 10, which arm is provided with a wedge face 61 adapted to engage the wedge face 59 on the hinged hand lever 56.

When the piston nears its lowest position, corresponding to the time the grease cylinder is nearly empty, the wedge face 61 will strike the wedge face 59, pressing the handle 56 backward out of engagement with the stop 58, and permitting the helix 50 to swing down under the pressure of the spring 55, so that the hinged frame 32 may be swung back far enough by the spring 55 to disengage the worm 22 of the worm gear 21. After this is effected, the ratchet wheel 38 may be reciprocated indefinitely, but without turning the gear wheel 21, or in any way affecting the piston rod or piston.

At this time it is desirable to refill the cylinder 2 with lubricant, which may be very readily accomplished by turning the hand crank 26 in the direction to rotate the worm gear 21, so as to lift the piston rod 10 and piston 12. As soon as the piston is lifted high enough, the lubricant is inserted through the opening 6 in the casting between the stanchions 5.

After the cylinder 2 has been re-charged with lubricant, the piston rod may be moved down by hand, by turning the hand crank 26 in the reverse direction, and when the piston bears firmly on the lubricant the hinged frame 32 may be swung back to the engaged position, which is done by swinging the hand lever 56 to the vertical position, as shown in Figs. 2 and 3 and causing it to engage the locking stud 58. This will throw the worm back in engagement with the worm gear, and the lubricator will now be in position to be operated by the engine as before.

It will be seen that by having the lubricator operated by some reciprocating part driven by the main engine, the supply of lubricant will be fed to the bearings to be lubricated with a speed directly proportional to that of the main engine, so that the faster the engine is driven the greater will be the supply of lubricant fed to the bearings, and vice versa.

Moreover, the feed of the lubricant may be varied by altering the throw of the ratchet wheel, so that a greater or less supply of lubricant may be furnished, irrespective of the speed of the engine.

Furthermore, it will be seen that the lubricator acts automatically and does not require the attention of any oilers, or others of the engineer's force, except at long intervals when it is necessary to refill the grease cylinder.

While the release of the hinged frame 32 will create an audible signal, an additional audible signal may be provided to indicate such release, if desired, such, for instance, as referred to in my application, Serial No. 90443, filed April 11, 1916, entitled "Force feed lubricator".

While I have shown the preferred type of lubricator to be used in the herein described method, I may use the force feed lubricator described in my application, Serial No. 90443, aforesaid, which is operated under the hydraulic ram principle.

It will be obvious that various modifications might be made in the herein described method and apparatus, and in the construction, combination and arrangement of parts which could be used without departing from the spirit of my invention.

Having thus described my invention what I claim and desire to secure by Letters Patent of the United States is:—

1. A force feed lubricator comprising a casting provided with a grease cylinder in the lower part thereof, a cross head at the upper end thereof, and stanchions with openings between connecting said grease cylinder and said cross head, a piston adapted to project into said grease cylinder, a screw-threaded piston rod secured to said piston and projecting through said cross head, said piston rod being provided with longitudinal spline grooves on opposite sides thereof, spline bars spanning said stanchions and each having a spline projecting into said grooves in the piston rod, a sleeve nut journaled in said cross head and engaging the screw threads on said piston rod, a worm gear fast on said sleeve nut, a worm engaging said worm gear, and means for rotating said worm, and throw-out mechanism controlled by the movement of said piston rod for automatically disengaging said worm from said worm gear, said throwout mechanism comprising a frame hinged to said casting and provided with journal bearings for said worm, a pin secured to said casting, a coil spring under compression mounted on said pin and normally pressing said hinged frame outward to disengage said worm, a fixed helix mounted on said pin, a movable helix revolubly mounted on said pin and adapted to engage the fixed helix, an arm hinged to said movable helix and adapted to turn same to the engaging position for holding said hinged frame against the action of said spring, means for locking said arm in the holding position, and an arm carried by the piston and adapted to engage said hinged arm and release same when said piston rod reaches a predetermined limit, substantially as described.

2. A force feed lubricator comprising a casting provided with a grease cylinder in the lower part thereof, a cross head at the upper end thereof, and stanchions with openings between connecting said grease cylinder and said cross head, a piston adapted to project into said grease cylinder, a screw-threaded piston rod secured to said piston and projecting through said cross head, said piston rod being provided with longitudinal spline grooves on opposite sides thereof, spline bars spanning said stanchions and each having a spline projecting into said grooves in the piston rod, a sleeve nut journaled in said cross head and engaging the screw threads on said piston rod, a worm gear cast on said sleeve nut, a worm engaging said worm gear, and means for rotating said worm, and throw-out mechanism controlled by the movement of said piston rod for automatically disengaging said worm from said worm gear, said throw-out mechanism comprising a frame hinged to said casting and provided with journal bearings for said worm, a pin secured to said casting, a coil spring under compression mounted on said pin and normally pressing said hinged frame outward to disengage said worm, a fixed helix mounted on said pin, a movable helix revolubly mounted on said pin and adapted to engage the fixed helix, an arm hinged to said movable helix and adapted to turn same to the engaging position for holding said hinged frame against the action of said spring, means for locking said arm in the holding position, and an arm carried by the piston and adapted to engage said hinged arm and release same when said piston rod reaches a predetermined limit, with means for rotating said worm gear by hand when said worm is out of engagement therewith, substantially as described.

3. A force feed lubricator comprising a grease cylinder, a piston adapted to project into said grease cylinder, a screw-threaded piston rod secured to said piston, a sleeve nut engaging the screw threads on said piston rod, means for holding said piston rod against turning in said nut, a worm gear fast on said sleeve nut, a worm engaging said worm gear, means for rotating said worm, and throw-out mechanism controlled by the movement of said piston rod for automatically disengaging said worm from said worm gear when the piston reaches a predetermined position in its travel, said throw-out mechanism comprising a hinged frame provided with journal bearings for said worm, a spring under compression tending to swing said hinged frame outward to disengage said worm, a pin, a fixed helix mounted on said pin, a movable helix also mounted on said pin, an arm hinged to said movable helix and adapted to turn same to the engaging position for holding said hinged frame against the action of said spring, means for locking said arm in the holding position, and an arm carried by the piston rod and adapted to engage said hinged arm and release same when said piston rod reaches a predetermined limit of its travel, substantially as described.

4. A force feed lubricator comprising a grease cylinder, a piston adapted to project into said grease cylinder, a screw-threaded piston rod secured to said piston, a sleeve nut engaging the screw threads on said piston rod, means for holding said piston rod against turning in said nut, a worm gear fast on said sleeve nut, a worm engaging said worm gear, means for rotating said worm, and throw-out mechanism controlled by the movement of said piston rod for automatically disengaging said worm from said worm gear when the piston reaches a predetermined position in its travel, with means for rotating said worm gear by hand when said worm is out of engagement therewith, said throw-out mechanism comprising a hinged frame provided with journal bearings for said worm, a spring under compression tending to swing said hinged frame outward to disengage said worm, a pin, a fixed helix mounted on said pin, a movable helix also mounted on said pin, an arm hinged to said movable helix and adapted to turn same to the engaging position for holding said hinged frame against the action of said spring, means for locking said arm in the holding position, and an arm carried by the piston rod and adapted to engage said hinged arm and release same when said piston rod reaches a predetermined limit of its travel, substantially as described.

In testimony whereof I affix my signature.

SAMUEL M. JENKINS.

Copies of this patent may be obtained for five cents each, by addressing the "Commissioner of Patents, Washington, D. C."